Figure 1:
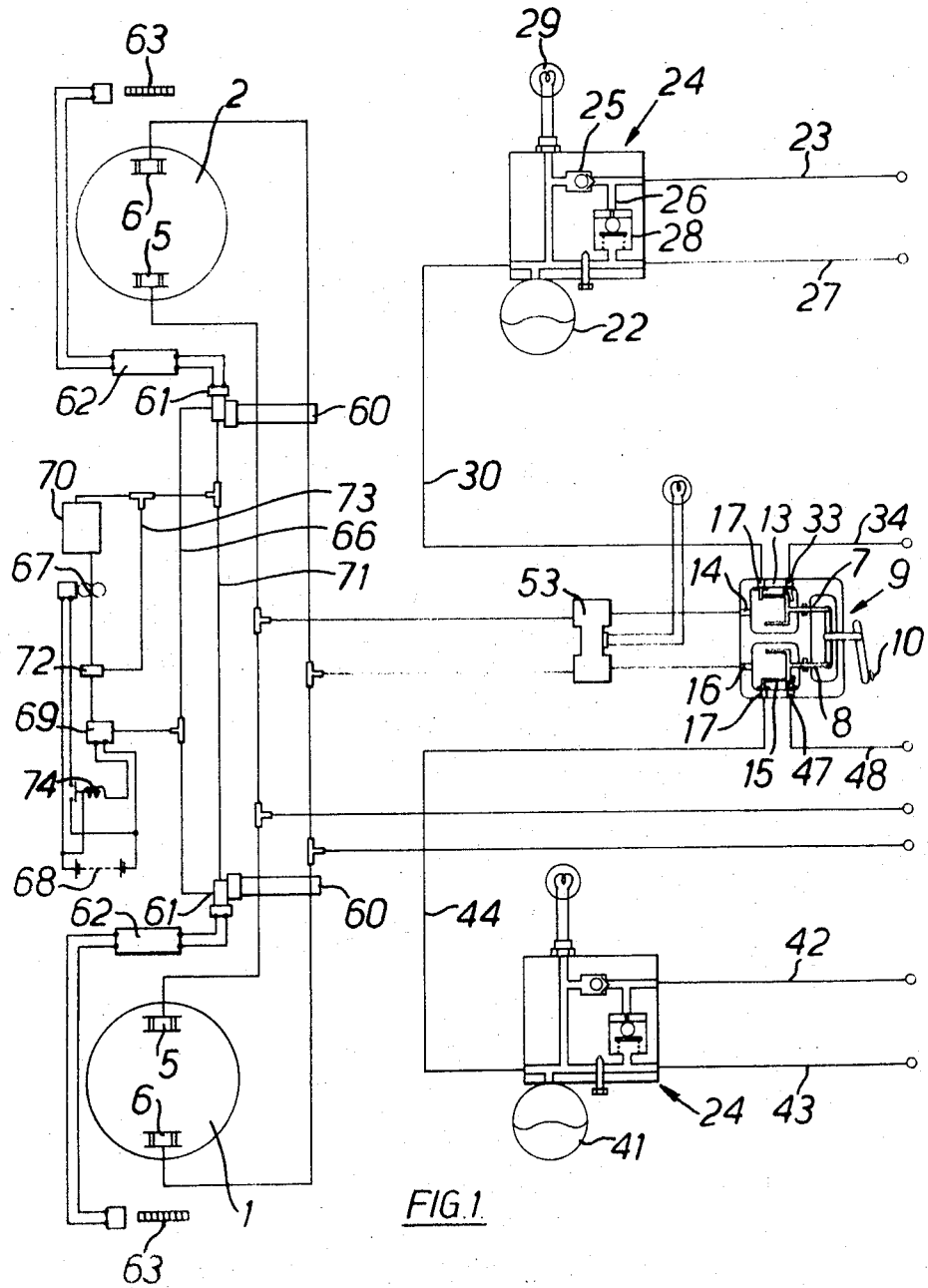

United States Patent [19]
Spence

[11] 3,770,325
[45] Nov. 6, 1973

[54] HYDRAULIC BRAKING SYSTEMS IN VEHICLES

[75] Inventor: Douglas Roy Spence, Olton, Warwickshire, England

[73] Assignee: Girling Limited, Tyseley, Birmingham, England

[22] Filed: Jan. 7, 1972

[21] Appl. No.: 216,211

[30] Foreign Application Priority Data
Jan. 15, 1971 Great Britain...................... 2,059/71
Mar. 2, 1971 Great Britain...................... 5,831/71

[52] U.S. Cl................... 303/10, 303/15, 188/106 P
[51] Int. Cl............................................. B60t 13/16
[58] Field of Search................. 303/10, 13, 15, 6 R; 188/106 P, 345

[56] References Cited
UNITED STATES PATENTS
3,524,683 8/1970 Stelzer............................ 303/10 X
3,677,607 7/1972 Schultz et al................ 188/106 P X
3,672,729 6/1972 Blakey......................... 188/106 P X
3,610,702 10/1971 MacDuff.......................... 303/10 X
3,067,842 12/1962 Smith.................................. 188/345
3,679,030 7/1972 Kawabe........................... 188/106 P FOREIGN PATENTS OR APPLICATIONS
1,388,448 12/1965 France................................ 303/10

Primary Examiner—M. Henson Wood, Jr.
Assistant Examiner—John J. Love
Attorney—Imirie & Smiley

[57] ABSTRACT

A vehicle braking system has two independent sources of pressure fluid, one powered by a mechanical pump the other by an electrical pump. Each wheel brake has two actuators, each actuator connected to a different pressure source. The hydraulic pressure supplied to both actuators of a wheel brake is regulated by means sensitive to the deceleration of the wheel.

7 Claims, 2 Drawing Figures

HYDRAULIC BRAKING SYSTEMS IN VEHICLES

This invention relates to hydraulic braking systems for vehicles.

According to our invention an hydraulic braking system for a vehicle comprises two different sources of hydraulic fluid under pressure, each source being connected to the brakes of at least one front wheel and at least one rear wheel so that the brakes on four wheels of the vehicle are supplied with pressure fluid.

Each pressure source may be connected to the brakes of one pair of diagonally opposite wheels. Or each pressure source may be connected to the brakes of two front wheels and one rear wheel.

Preferably each of the brakes of two front wheels and two rear wheels has two separate actuators and each of the actuators is connected to a different pressure source.

In all these systems, if one pressure source fails, the brakes on at least one front and one rear wheel can still be operated.

The pressure sources each comprise a pump, or an hydraulic accumulator pressurised by a pump, and each pump is driven by an independent energy source. Conveniently one pump is mechanically driven from the prime mover of the vehicle and the other pump is electrically driven.

Thus, when the prime mover is idling there may be insufficient output from the mechanically driven pump to maintain adequate hydraulic pressure to operate a wheel brake. Under such conditions the electrically driven pump will still function. Conversely if a fault in the electrical system causes an inadequate output from the electrically driven pump, the mechanically driven pump will still function. It is most unlikely that both pumps will fail at the same time.

The supply of hydraulic fluid from each source to the wheel brakes is controlled by a single control valve assembly. Means may be incorporated for indicating the differential pressure between the two pressure sources, preferably downstream of the control valve assembly.

A braking system, according to our invention, may incorporate means for regulating the hydraulic pressure supplied to an actuator of a wheel brake when the deceleration of the wheel exceeds a predetermined value. In systems in which a wheel brake has two actuators supplied from different pressure sources, the hydraulic pressure supplied to both actuators is regulated.

Figure 2:
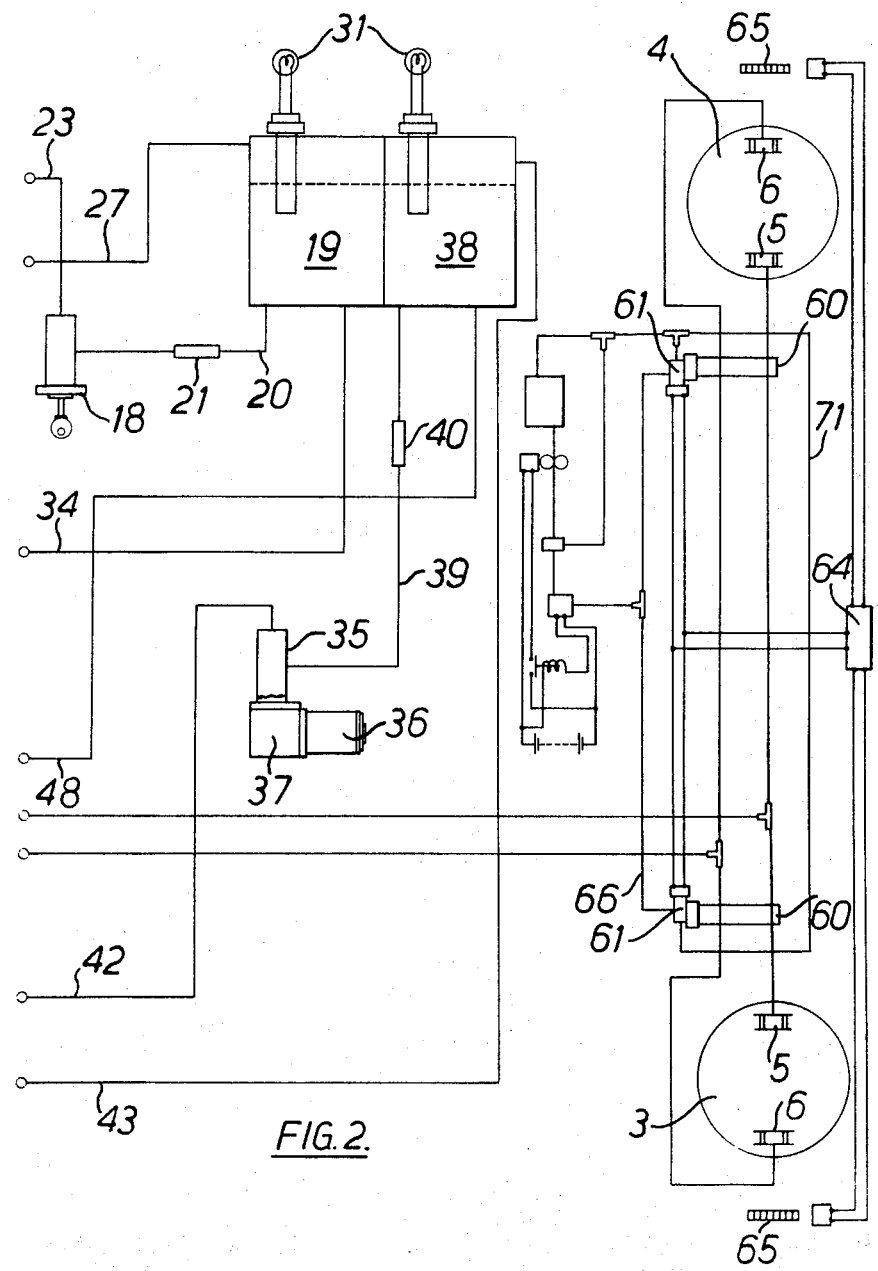

An embodiment of our invention is illustrated in the accompanying drawings in which FIGS. 1 and 2, taken together, show an hydraulic braking system for a vehicle.

In the system illustrated 1 and 2 are brakes on the front wheels of the vehicle and 3 and 4 are brakes on the rear wheels. Each brake 1, 2, 3 and 4 is adapted to be operated by a pair of hydraulic actuators 5 and 6 each conveniently comprising a slave cylinder and each supplied with fluid from a different source of hydraulic fluid under pressure under the control of a separate pedal-operated control valve 7, 8. Operation of one actuator of each brake is sufficient to effect efficient operation of that brake.

As illustrated the control valves 7 and 8 are combined into a single assembly 9 and are operated simultaneously by a pedal 10 coupled to the operating pistons of the control valves through a balance bar.

The piston of the control valve 7 works in a bore 13 defining a pressure space which is connected through an outlet port 14 and pipe-lines to the four hydraulic actuators 5.

Similarly the piston of the control valve 8 works in a bore 15 defining a pressure space which is connected through an outlet port 16 and pipe-lines to the four hydraulic actuators 6.

The pressure spaces of the control valves are connected to separate and independent pressure sources through ports 17 spaced forwardly of the inner end of the pistons.

As illustrated the pressure source connected to the pressure space 13 of the control valve 7 comprises a pump 18 which is driven by the engine of the vehicle. The pump 18 draws hydraulic fluid from a reservoir 19 through a pipe-line 20 in which is located a filter 21 and pumps it to an hydraulic accumulator 22 through a pipe-line 23 and an unloader valve 24. The unloader valve 24 incorporates a one-way valve 25 through which fluid is pumped to the accumulator 22, and a by-pass passage 26 is connected between the upstream side of the one-way valve 25 and a return pipe-line 27 to the reservoir 19. A one-way valve 28 incorporated in the by-pass passage 26 opens to allow fluid to be pumped in a closed circuit from and to the reservoir 19 when the pressure of fluid in the accumulator attains a value at which the one-way valve 25 closes.

The unloader valve 24 is provided with a warning light 29 which is energised when the pressure of fluid in the accumulator is below a predetermined value.

The accumulator 22 is connected to the port 17 in the control valve 7 through a pipe-line 30, and the port 17 is normally closed by a spring-loaded tilting valve. A second spring-loaded tilting valve, which is normally held in an open position by the piston, controls communication through a port 33 communicating with the pressure space 13 and connected to the reservoir 19 through a return line 34.

The pressure source connected to the pressure space 15 of the control valve 8 comprises a pump 35 which is driven from an electric motor 36 through a cam or gear box 37. The pump 35 draws hydraulic fluid from a reservoir 38, which is independent of the reservoir 19, through a pipe-line 39 in which is located at filter 40, and fluid is pumped to an hydraulic accumulator 41 through a pipe-line 42.

The accumulator 41 is connected to the port 17 of the control valve 8 through a pipe-line 44, and the port 17 is normally closed by a spring-loaded tilting valve. A second spring-loaded tilting valve, which is normally held in an open position by the piston, controls communication through a port 47 communicating with the pressure space 15 and connected to the reservoir 38 through a return line 48.

The accumulator 41 is supplied via an unloader valve 24 which unloads to reservoir 38 through pipe-line 43. Both reservoirs 19 and 38 are provided with fluid level warning lights 31.

When the system is operating normally and both accumulators are fully charged, operation of the pedal 10 of the control valve assembly 9 advances both pistons simultaneously to allow the tilting valves to close ports 33 and 47. Further movement of the pistons in the same direction opens the tilting valves controlling ports 17 so that fluid under pressure is supplied to the two sets of actuators 5 and 6 simultaneously to apply the brakes.

When the vehicle is operating under conditions in which the engine is idling for a period and the foot pedal 10 is de-pressed to operate the brakes a number of times within that period, the pump 18 will be driven at a speed which is insufficient to maintain a predetermined working pressure in the accumulator 22. Thus the accumulator 22 will eventually become exhausted. Under such conditions the brakes are applied by means of the actuators 6 to which fluid under pressure is supplied from the accumulator 41.

Should the electric motor 36 or the pump 35 fail, under normal operating conditions the brakes can be operated effectively by the actuators 5 supplied with fluid under pressure from the accumulator 22.

Means 53 are incorporated for indicating the differential pressure between the outlet 14 and 16 and the actuators 5 and 6 which they supply. These means 53 from the subject of a U.S. Pat. application No. 33171/69 and need not be described further herein.

In a modification to the system described pumps 18 and 35 draw from a common reservoir and the unloader valves 24 discharge into the same reservoir.

In another modification accumulator 41 is charged directly through a one-way valve, the electric motor 36 being controlled by a switch sensitive to the pressure in pipe-line 42 or accumulator 41.

The braking system illustrated in the drawings incorporates means for regulating the hydraulic pressure supplied to the actuators 5 and 6 when the deceleration of a wheel exceeds a predetermined value i.e. the system is protected against wheel slip or skid.

In the drawings fluid under pressure from the independent pressure sources is supplied to the actuators 5 and 6 of each wheel brake through a tandem modulator 60. Each tandem modulator is of the kind described in the Complete Specification of our copending cognate U.S. Pat. application Nos. 531/70, 43814/70 and 43815/70 with reference to FIGS. 5, or 8 of the drawings; in the Complete Specification of our co-pending U.S. Pat. application No. 45705/69 with reference to FIG. 5; or in the Complete Specification of our co-pending cognate U.S. Pat. applications Nos. 6467/70, 13117/70 and 43813/70 with reference to FIG. 4 of the drawings.

The operation of each tandem modulator 60 is controlled by a solenoid-operated control valve 61. Each solenoid-operated control valve 61 may be of the kind described in Complete Specification of copending Pat. application No. 45705/69 with reference to FIG. 3 of the accompanying drawings; in the Complete Specification of our co-pending cognate U.S. Pat. applications Nos. 531/70, 43814/70 and 43815/70 with reference to FIG. 3 of the accompanying drawings; and in the Complete Specification of our co-pending cognate U.S. Pat. applications Nos. 6467/70, 13117/70 and 43813/70 with reference to FIG. 3 of the accompanying drawings. Preferably, however, each solenoid-operated control valve 61 is in accordance with the construction described in the Complete Specification of our copending cognate U.S. Pat. applications Nos. 9769/70 and 13116/70.

The solenoid-operated control valves 61 of the tandem modulators of the brakes 1 and 2 on the front wheel of the vehicle are each adapted to be energised by the D.C. output from an electronic control module 62 which receives an A.C. output signal from an electrically inductive sensor 63 sensing the deceleration of that wheel.

Similarly the solenoid-operated control valve 61 of the tandem modulators of the brakes 3 and 4 on the rear wheels of the vehicle are both adapted to be energised simultaneously by a D.C. output from common electronic control module 64 which receives A.C. output signals from electrically inductive sensors 65, each sensing the deceleration of one of the rear wheels.

The tandem modulators 60 are normally held in open positions, in which fluid under pressure can be supplied the independent pressure sources simultaneously to at least one of the actuators 5 and 6 of each wheel brake, by pressure fluid supplied to one side of the movable wall of each modulator through a pipe-line 66 and the control valve of that modulator. A separate supply of pressure fluid is provided for the brakes on the front wheel of the vehicle, and for the brakes on the rear wheels of the vehicle, (reference numerals are only applied to the supply of pressure fluid for the front wheel brakes, the supply to the rear wheel brakes being the same). Each supply comprises an electrically driven pump 67 which is energised by an electrical storage battery 68 and which is connected to the pipe-line 66 on the downstream side of a low-pressure switch 69. The pump 67 is supplied with fluid from a reservoir 70 connected to a return and exhaust line 71 from each of the two solenoid-operated control valves 61, and the pump 67 is provided with an electrical cut-off which switches off the pump at a predetermined delivery pressure, for example 300 p.s.i.

A pressure relief valve 72 is located between the pump 67 and the low-pressure switch 69. When the pressure of fluid supplied by the pump 67 exceeds a predetermined pressure, substantially higher than that at which the low pressure warning switch 69 is energised and the electrical cut-off for the pump 61 fails, the relief valve 72 places the pump 67 and the pipe-line 66 in communication with the reservoir 70 through a by-pass line 73.

Should the pressure on the discharge side of the pump 67 and in the pipe-line 66 drop below the predetermined minimum value, the low pressure switch 69 energises a relay 74 to make a circuit with the battery 68 and energise the pump 67.

When the deceleration of a front braked wheel exceeds a predetermined value, the control module 62, in response to a signal from the sensor 63 of that wheel, energises the solenoid of the control valve 61 to which it is connected which, in turn, causes fluid under pressure from the pump 67 to be supplied to the opposite side of the movable wall of the tandem modulator 60. The supply of fluid under pressure to the opposite side of the movable wall moves the expander pistons in the tandem modulator 60 in a direction to cut-off the supply of fluid to the actuator 5 and 6 of that brake from the independent pressure sources. Thereafter, further movement of the expander pistons in the same direction relieves the pressure of fluid applied to the actuators 5 and 6 by increasing the effective volumes of the chambers in the modulator through which fluid is supplied to the actuators 5 and 6.

When the deceleration of that wheel is reduced to a value equal to or below the predetermined value, the control module de-energises the solenoid of the control valve 61 and the expander pistons move in the opposite direction to re-actuate the actuators 5 and 6. Under these conditions the fluid supplied through the control valve 61 to the opposite side of the movable wall of the modulator is exhausted to the reservoir 70 through the control valve 61 and the exhaust and return line 71.

When the deceleration of a rear braked wheel exceeds a predetermined value, the common control module 64 receives an A.C. signal from the sensor 65 of that wheel. The control module 64 energises the solenoids of both control valves 61 to actuate the valve and cut-off and subsequently relieve the braking pressure applied to the actuators 5 and 6 of both rear wheel brakes from the independent pressure sources as described above in connection with the cut-off and relief of the braking pressure applied to a front wheel brake.

I claim:

1. An hydraulic braking system for a vehicle having a prime mover and at least front and rear wheels, comprising a hydraulically operated brake for each vehicle wheel, a first pump mechanically driven by the prime mover of the vehicle, a second electrically driven pump, means from each pump supplying hydraulic fluid under pressure to the wheel brakes of at least one front wheel and at least one rear wheel of the vehicle so that the brakes on four wheels of the vehicle are supplied with pressure fluid, and means for modulating the pressure of fluid supplied to the brakes under skid conditions and comprising a modulator having a variable volume chamber connected in the supply of pressure fluid to a wheel brake, the volume of the chamber being controlled by hydraulic fluid under pressure.

2. A braking system as in claim 1 in which each of the first and second pumps is connected to the brakes of one pair of diagonally opposite wheels.

3. A braking system as in claim 2 in which each of the first and second pumps is connected to the brakes of two front wheels and one rear wheel.

4. A braking system as in claim 1 in which each wheel brake has two separate actuators, one connected to the first pump and the other connected to the second pump, and a single control valve assembly controls the supply of hydraulic fluid from the first and second pumps to the wheel brakes.

5. A braking system as in claim 4 in which the control valve assembly comprises two pistons operated simultaneously by the same pedal, each piston, when operated opening a tipping valve controlling a port in the valve assembly connected to one of the first and second pumps.

6. A braking system as in claim 4 wherein said modulating means comprises a third pump controlling the volume of said chamber.

7. A braking system as in claim 6 in which a tandem modulator having two variable volume chambers modulates the pressure of fluid supplied to both actuators of each wheel brake, and two third pumps are provided, one for the modulators on the front wheels and the other for the modulators on the rear wheels.

* * * * *